US010657363B2

(12) United States Patent
Alameh et al.

(10) Patent No.: US 10,657,363 B2
(45) Date of Patent: May 19, 2020

(54) METHOD AND DEVICES FOR AUTHENTICATING A USER BY IMAGE, DEPTH, AND THERMAL DETECTION

(71) Applicant: Motorola Mobility LLC, Chicago, IL (US)

(72) Inventors: Rachid Alameh, Crystal Lake, IL (US); Jarrett Simerson, Glenview, IL (US); Thomas Gitzinger, Libertyville, IL (US)

(73) Assignee: Motorola Mobility LLC, Chicago, IL (US)

( * ) Notice: Subject to any disclaimer, the term of this patent is extended or adjusted under 35 U.S.C. 154(b) by 90 days.

(21) Appl. No.: 15/795,076

(22) Filed: Oct. 26, 2017

(65) Prior Publication Data

US 2019/0130171 A1    May 2, 2019

(51) Int. Cl.
*G06K 9/00* (2006.01)
*G06T 7/20* (2017.01)
(Continued)

(52) U.S. Cl.
CPC .......... *G06K 9/00288* (2013.01); *G01B 11/22* (2013.01); *G01J 5/0025* (2013.01); *G01K 3/14* (2013.01); *G06K 9/00201* (2013.01); *G06K 9/00281* (2013.01); *G06K 9/00899* (2013.01); *G06K 9/2018* (2013.01); *G06K 9/22* (2013.01);
(Continued)

(58) Field of Classification Search
CPC combination set(s) only.
See application file for complete search history.

(56) References Cited

U.S. PATENT DOCUMENTS 6,393,136 B1 * 5/2002 Amir ...................... G06F 3/011
348/14.01
8,589,968 B2 11/2013 Alberth et al.
(Continued)

FOREIGN PATENT DOCUMENTS

WO 2014/143534 9/2014
WO 2014/158508 10/2014

OTHER PUBLICATIONS

EXIF Tags—Description and Tools; Published on https://www.sno.phy.queensu.ca/~phil/exiftool/TagNames/EXIF.html; Unknown Publication Date but last revised Feb. 13, 2018.
(Continued)

*Primary Examiner* — Alex Kok S Liew
(74) *Attorney, Agent, or Firm* — Philip H. Burrus, IV

(57) ABSTRACT

An electronic device includes a two-dimensional imager, a three-dimensional imager, and a thermal sensor. One or more processors determine whether at least one image captured by the two-dimensional imager matches a first predefined criterion, whether at least one facial depth scan captured by the three-dimensional imager matches a second predefined criterion, and whether thermal energy detected by the thermal sensor matches a third predefined criterion. Touchless authentication of a person as an authorized user of the electronic device occurs when the at least one image matches the first predefined criterion, the at least one facial depth scan matches the second predefined criterion, and the thermal energy matches the third predefined criterion. Additional security factors, such as the expression of a predefined mien, can be used as well.

20 Claims, 8 Drawing Sheets

(51) Int. Cl.

| | |
|---|---|
| *G06T 7/593* | (2017.01) |
| *G06T 7/70* | (2017.01) |
| *G01K 3/14* | (2006.01) |
| *G01B 11/22* | (2006.01) |
| *G06K 9/20* | (2006.01) |
| *G06K 9/22* | (2006.01) |
| *G01J 5/00* | (2006.01) |
| *G06K 9/62* | (2006.01) |

(52) U.S. Cl.
CPC .............. *G06K 9/6289* (2013.01); *G06T 7/20* (2013.01); *G06T 7/593* (2017.01); *G06T 7/70* (2017.01); *G06K 9/00302* (2013.01); *G06T 2207/10028* (2013.01); *G06T 2207/30201* (2013.01)

(56) References Cited

U.S. PATENT DOCUMENTS

| | | | |
|---|---|---|---|
| 8,593,452 B2 | 11/2013 | Solem et al. | |
| 9,384,386 B2 | 7/2016 | Lee et al. | |
| 9,471,838 B2 | 10/2016 | Miller et al. | |
| 2004/0071367 A1* | 4/2004 | Irani | G06T 7/20 382/284 |
| 2012/0257797 A1* | 10/2012 | Leyvand | G06K 9/00221 382/118 |
| 2015/0227782 A1 | 8/2015 | Salvador et al. | |
| 2016/0026329 A1* | 1/2016 | Fadell | G06F 21/316 345/173 |
| 2017/0193282 A1 | 7/2017 | Valko et al. | |

OTHER PUBLICATIONS

"How to Copyright Photographs", Published on WikiHow; https://www.wikihow.com/Copyright-Photographs ; Exact Publication Date Unknown but prior to filing of present application.

"JPEG Roatation and EXIF Orientation", Instructions published on Impulse Adventure Website; https://www.impulseadventure.com/photo/exif-orientation.html ; Exact Publication Date unknown but prior to filing of present application.

"Logo Licious", Logo Licious—Add your own logo, watermark, and text to photos; App available on GooglePlay; Initial Publicaiton Unknown; Updated Mar. 2, 2018.

Bailey, Jonathan , "Adding Copyright to Exif Automatically", Article Published on website Plagiarism Today; https://www.plagiarismtoday.com/2009/03/26/adding-copyright-to-exif-automatically/ ; Published Mar. 26, 2009.

Doerrfeld, Bill , "20+ Emotion Recognition APIs That Will Leave You Impressed, and Concerned", Blog; Posted at https://nordicapis.com/author/billdoerrfeld/ ; Posted Dec. 31, 2015.

Peters, Richard , "Add copyright info to your photos EXIF", Richard Peters Wildlife Photography; Available at https://www.richardpeters.co.uk/quick-tip-add-copyright-info-to-your-photos-exif/ ; Unknown Publication Date but prior to filing of present application.

Wilhelm, Parker , "Try Google's emotion-detecting image API for yourself", Article published on TechRadar; www.techradar.com; Published Feb. 18, 2016.

* cited by examiner

US 10,657,363 B2

METHOD AND DEVICES FOR AUTHENTICATING A USER BY IMAGE, DEPTH, AND THERMAL DETECTION

BACKGROUND

Technical Field

This disclosure relates generally to electronic devices, and more particularly to user authentication in electronic devices.

Background Art

Not so very long ago, the thought of being able to carry a telephone in a pocket seemed like science fiction. Today, however, a smartphone not much bigger than an index card slips easily into the pocket and has more computing power than the most powerful desktop computers of a decade ago.

With all of this computing power, users of smartphones and other electronic devices rely on the same to perform an ever-increasing number of tasks. In addition to voice, text, and multimedia communication, users employ smartphones to execute financial transactions, record, analyze, and store medical information, store pictorial records of their lives, maintain calendar, to-do, and contact lists, and even perform personal assistant functions. To perform such a vast array of functions, these devices record substantial amounts of "private" data about the user, including their location, travels, health status, activities, friends, and more.

With such personal information stored in the device, it is desirable to ensure that only the user—or those authorized by the user—have access to this data. At the same time, it is desirable to provide for a simple, quick, and easy user interface that allows for quick access to the device. It would be advantageous to have an improved user interface for authenticating the user.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
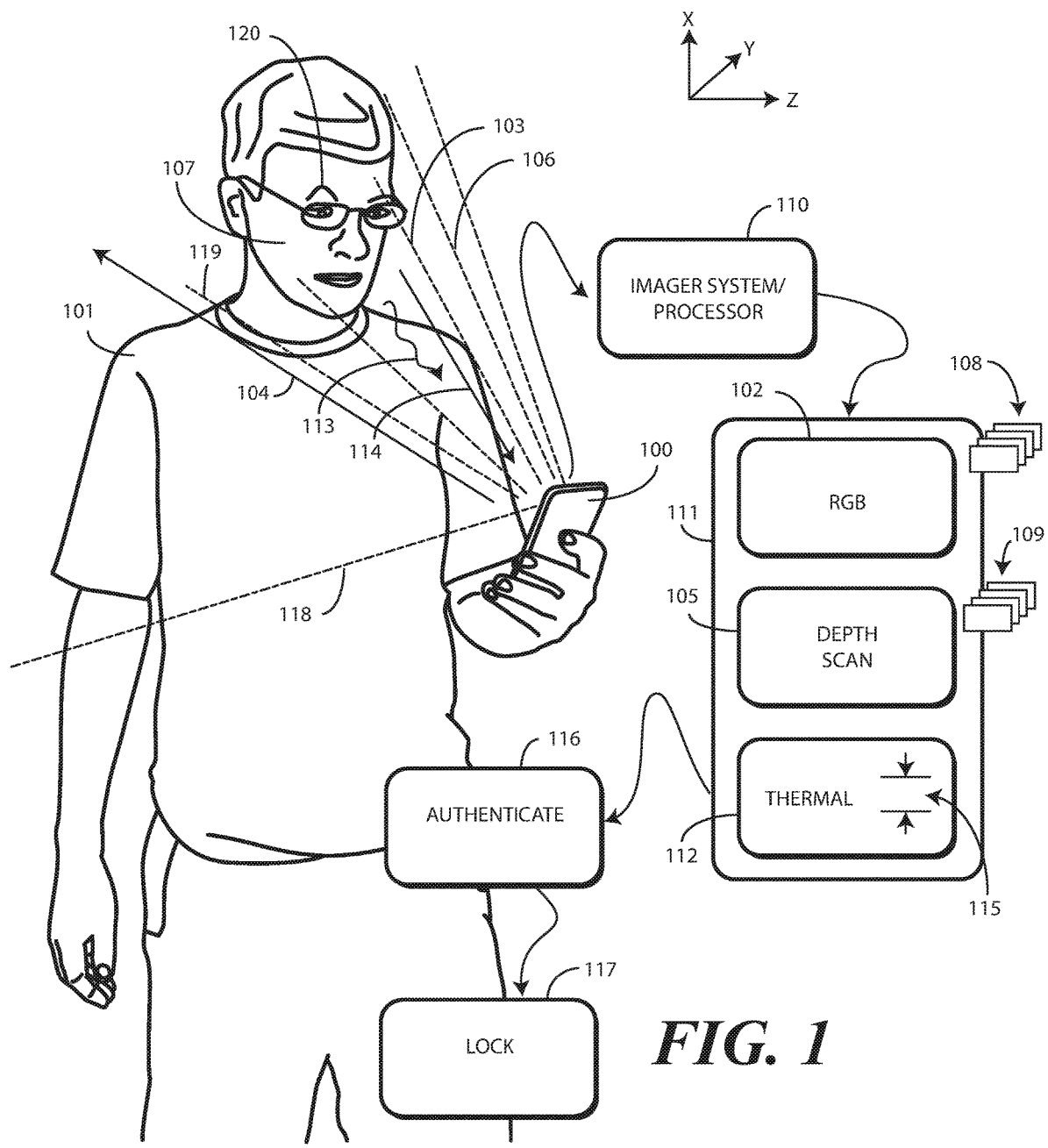
FIG. 1 illustrates one explanatory system and method in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to methods and systems for authenticating a user using combinations of Red-Green-Blue (RGB) images, depth scans, temperature measurements, and other factors. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of authenticating a user in an electronic device, without the user having to necessarily touch the electronic device or interact with the device with their fingers, described herein. The non-processor circuits may include, but are not limited to, a radio receiver, a radio transmitter, signal drivers, clock circuits, power source circuits, and user input devices. As such, these functions may be interpreted as steps of a method to perform truly "touchless" user authentication. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide systems and methods that allow for "touchless" authentication of a user. In one or more embodiments, sensors such as one or more imagers, one or more depth scanners, and one or more thermal sensors capture two-dimensional images, three-dimensional scans, and thermal measurements to authenticate a person as a predefined user or owner of an electronic device in which the sensors are disposed.

In one or more embodiments, specific facial features can be used as silent passwords to further confirm that a particular person is, in fact, the authorized user of the device. For instance, in one or more embodiments a person can express a mien, such as deliberately raising one or more eyebrows, intentionally closing one or more eyes, touching their face with fingers, opening or closing their mouth, making an exaggerated "happy" or "sad" face, styling their hair in a particular fashion, or orienting the device relative to their face at a particular angle, e.g., capturing a frond, side, or sweep image, as a higher threshold authentication factor. This mien, known only to the user, prevents a would-be user from attempting to gain access to the device using, for example, a warm, three-dimensional mask of the true user's countenance. Thus, in one or more embodiments, not only are RGB images, thermal detection, and depth scans used to identify the naturally occurring look and shape of an authenticated user's face, but the RGB images, thermal detection, and depth scans must confirm that the mien is being expressed as well before access to the device is granted. Examples of this will be described in more detail below. Still others will be obvious to those of ordinary skill in the art having the benefit of this disclosure.

In one or more embodiments, a two-dimensional imager, such as an RGB imager, an infrared imager, or other imager, is used in combination with a depth scan from a stereo camera, structured light depth imager, or time of flight imager, which may operate in the infrared spectrum, is used to preliminarily authenticate a user. The depth scan adds a third "z-dimension" to the x-dimension and y-dimension defining the two-dimensional image, thereby enhancing the security of using a person's face as their password in the process of authentication by facial recognition.

Additionally, another benefit of using the depth scan is the prevention of someone "faking" traditional facial recognition systems relying solely on two-dimensional images. Illustrating by example, with conventional facial recognition systems that rely only upon two-dimensional images captured by an imager, a person trying to get unauthorized access may simply snap a picture of a two-dimensional photograph of the authorized user. The use of a depth scan prevents this type of chicanery by requiring that a three-dimensional object be present before the authentication system.

Moreover, consider the situation where the malefactor goes to the extreme of making a three-dimensional mask of the authorized user. If only a two-dimensional image and a depth scan are used in an authentication system, this could conceivably result in unauthorized access to the device being obtained. Advantageously, one or more embodiments of the present disclosure further require a thermal sensor to detect an amount of thermal energy received from an object within a thermal reception radius of the electronic device. Only where the amount of thermal energy received form the object is within a predefined temperature range will access be granted in one or more embodiments. Advantageously, this prevents the use of three-dimensional masks from "tricking" the authentication system by posing as an authenticated user.

But what if the malefactor is worse than that, i.e., is a true villain? What if they go to the trouble of creating a heated, i.e., warm, three-dimensional model or mask of the authorized user in an effort to trick the combined imager, depth imager, and thermal sensor? Advantageously embodiments of the disclosure contemplate such acts of nefariousness. In one or more embodiments, the imager captures a plurality of images, while the depth imager obtains a plurality of depth scans. In one or more embodiments, the authentication system requires movement, e.g., a change in facial expression, a touch of the cheek, a new orientation of the electronic device relative to the user, etc., to perform a multi-step authentication, wherein authentication operations are separated by a short time period. In one or more embodiments, if no facial changes or other motion are detected in the sequential authentication operations, the authentication concludes that the object being authenticated is inanimate. However, where motion is detected, e.g., where the object blinks, opens the mouth, raises eyebrows, changes posture, moves the head relative to the neck, and so forth, the authentication system confirms that the object is animate, and is more likely to be the authentic user rather than a poor, inanimate reproduction thereof.

In one or more embodiments, even more security can be employed. For example, in one or more embodiments following capture of at least one image with an imager, at least one depth scan with a depth imager, and an amount of thermal energy received form an object, images and/or depth scans from different fields of view can be captured. In one or more embodiments at least a first image is captured with a first field of view, and at least a second image is captured with a second field of view, wherein the first field of view and the second field of view are different. Illustrating by example, in one embodiment following facial and depth authentication, when a person wants to gain access to an electronic device, visual authentication starts "zoomed out," i.e., with a wide field of view, to show the person's entire body, and perhaps the person's hands physically touching the electronic device and pointing the same toward their countenance. After this, the imager and/or depth imager can quickly "zoom in," i.e., move to a narrower field of view to capture images only of the face for authentication elimination of smaller "fake" objects or pictures carried only in the hand.

Other higher authentication factors can be included beyond the simple two-dimensional image capture, depth scan, and temperature measurement as well. For example, in another embodiment where an electronic device includes authentication systems on the front and rear surfaces of the device, differences between images captured by the front imager and the second imager can be used as authentication factors. If, for instance, the front and rear imagers show only one person nearby, the authentication system can eliminate the possibility that a fakir is holding the device in front of a fake object, such as a mask, warm mask, or picture. Additionally, in one or more embodiments a user can store one or more predefined facial features such as hair color, eye color, skin color, head-to-neck size or diameter ratio, neck-to-body size or diameter ratio, location history, and so forth. In one or more embodiments, only when one or more of these predefined facial features are sufficiently matched will authentication occur.

In other embodiments, device orientation can be used as an authentication factor. For example, detecting whether the device is oriented so as to capture a "selfie" or an image from the rear imager prevents someone from getting access to an electronic device, pointing it in the direction of the authorized user, capturing a rearward shot, and obtaining access to the device. In still other embodiments, a predefined distance at which the image, depth scan, and temperature measurement are made can be required. For example, in one or more embodiments where the image, depth scan, and temperature are not captured within a predefined distance range, such as between a distance of one and two feet, authentication may not occur. Other authentication factors will be described below. Still others will be obvious to those of ordinary skill in the art having the benefit of this disclosure.

Accordingly, embodiments of the disclosure allow for the usage of two-dimensional images, three-dimensional depth scans, thermal measurements, and optionally pre-saved facial features, changing facial features, repeated authentication attempts, movement or facial changes between authentication attempts, location context, user specific history data, device orientation during access, e.g., selfie vs. pointing away, zooming in and out between different fields of view, and other factors to authenticate a user of an electronic device. Using these factors, a robust, "touchless" authentication system is provided.

Advantageously, embodiments of the disclosure provide a highly secure, touchless authentication system that uses a combination of two-dimensional images, three-dimensional depth scans, thermal measurements, optionally in combination with facial features and various other "anti-spoofing" techniques to prevent a malfeasant from faking the countenance of a user to gain access to an electronic device. Higher level security factors include detecting touchless respiration, the "liveliness" of a person, touchless heart rate sensing, overall scene assessment from field of view changes, multiple images on multiple faces of the electronic device, and other multiple imagers, software features to reduce the possibility of spoofing. Still other factors will be obvious to those of ordinary skill in the art having the benefit of this disclosure. It will be appreciated that embodiments of the disclosure described herein may be carried out with one or more conventional processors and unique stored program instructions that control the one or more processors to implement, in conjunction with certain non-processor circuits, cloud communication, credential match and assessment, security level setting, fake access prevention and mitigation, user interface, device interaction, context assessment, user profile evaluation, device lock, device access, preventative measures, continuous monitoring of user credentials in the background during and after device access, audible and/or visual and/or wireless communication, and alerts as described herein.

Turning now to FIG. 1, illustrated therein is one explanatory electronic device 100 configured in accordance with one or more embodiments of the disclosure. Also shown in FIG. 1 are one or more method steps for the electronic device 100.

In FIG. 1, a user 101 is authenticating himself as an authorized user of the electronic device 100 in accordance with one or more embodiments of the disclosure. In this illustrative embodiment, the authentication process is "touchless" in that the user 101 need not manipulate or interact with the electronic device 100 using his fingers. To the contrary, in accordance with one or more embodiments of the disclosure, the user is authenticated using a combination of two-dimensional imaging, depth scan imaging, thermal sensing, and optionally one or more higher authentication factors.

In this illustrative embodiment, an imager 102 captures at least one image 103 of an object situated within a predefined radius 104 of the electronic device 100, which in this case is the user 101. In one embodiment, the imager 102 captures a single image 103 of the object. In another embodiment, the imager 102 captures a plurality of images 103,118 of the object. In one or more embodiments, the one or more images 103 are each a two-dimensional image. For example, in one embodiment the image 103 is a two-dimensional RGB image. In another embodiment, the image 103 is a two-dimensional infrared image. Other types of two-dimensional images will be obvious to those of ordinary skill in the art having the benefit of this disclosure.

In one or more embodiments, the image 103 can be compared to one or more predefined reference images 108. By making such a comparison, one or more processors 110 can confirm whether the shape, skin tone, eye color, hair color, hair length, and other features identifiable in a two-dimensional image are that of the authorized user identified by the one or more predefined reference images 108.

In addition to the imager 102 capturing the image 103, in one or more embodiments a depth imager 105 captures at least one depth scan 106 of the object when situated within the predefined radius 104 of the electronic device 100. In one embodiment, the depth imager 105 captures a single depth scan 106 of the object. In another embodiment, the depth imager 105 captures a plurality of depth scans 106,119 of the object.

Figure 3:
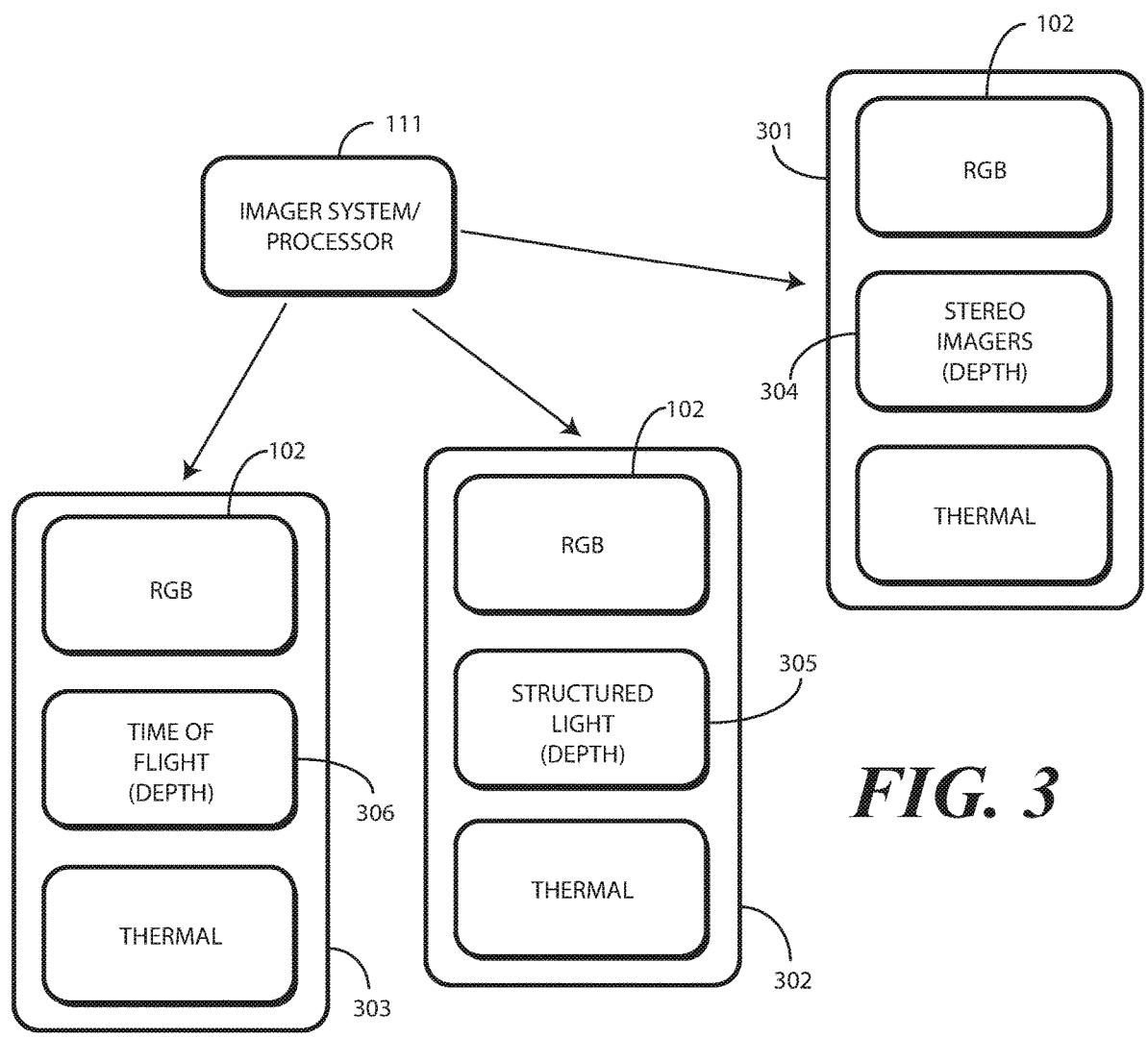
FIG. 3 illustrates explanatory components of one explanatory system in accordance with one or more embodiments of the disclosure.

As will be described below in more detail with reference to FIG. 3, the depth imager 105 can take any of a number of forms. These include the use of stereo imagers, separated by a predefined distance, to create a perception of depth, the use of structured light lasers to scan patterns—visible or not—that expand with distance and that can be captured and measured to determine depth or projecting different patterns, time of flight sensors that determine how long it takes for an infrared or laser pulse to translate from the electronic device 100 to the user 101 and back. Other types of depth imagers will be obvious to those of ordinary skill in the art having the benefit of this disclosure. However, in each case, the depth scan 106 creates a depth map of a three-dimensional object, such as the user's face 107. This depth map can then be compared to one or more predefined facial maps 109 to confirm whether the contours, nooks, crannies, curvatures, and features of the user's face 107 are that of the authorized user identified by the one or more predefined facial maps 109.

In one or more embodiments, the image 103 and the depth scan 106 are used in combination for authentication purposes. Illustrating my example, in one or more embodiments one or more processors 110 compare the image 103 with the one or more predefined reference images 108. The one or more processors 110 then compare the depth scan 106 with the one or more predefined facial maps 109. Authentication will fail in one or more embodiments unless the image 103 sufficiently corresponds to at least one of the one or more predefined images 108 and the depth scan 106 sufficiently corresponds to at least one of the one or more predefined facial maps 109. As used herein, "sufficiently" means within a predefined threshold. For example, if one of the predefined images 108 includes 500 reference features, such as facial shape, nose shape, eye color, background image, hair color, skin color, and so forth, the image 103 will sufficiently correspond to at least one of the one or more predefined images 108 when a certain number of features in the image 103 are also present in the predefined images 108. This number can be set to correspond to the level of security desired. Some users may want ninety percent of the reference features to match, while other users will be content if only eighty percent of the reference features match, and so forth.

As with the predefined images 108, the depth scan 106 will sufficiently match the one or more predefined facial maps 109 when a predefined threshold of reference features in one of the facial maps is met. In contrast to two-dimensional features found in the one or more predefined images 108, the one or more predefined facial maps 109 will include three-dimensional reference features, such as facial shape, nose shape, eyebrow height, lip thickness, ear size, hair length, and so forth. As before, the depth scan 106 will sufficiently correspond to at least one of the one or more predefined facial maps 109 when a certain number of features in the depth scan 106 are also present in the predefined facial maps 109. This number can be set to correspond to the level of security desired. Some users may want ninety-five percent of the reference features to match, while other users will be content if only eighty-five percent of the reference features match, and so forth.

The use of both the image 103 and the depth scan 106 as combined authentication factors is far superior to using one or the other alone. The depth scan 106 adds a third "z-dimension" to the x-dimension and y-dimension data found in the image 103, thereby enhancing the security of using the user's face 107 as their password in the process of authentication by facial recognition. Another benefit of using the depth scan 106 in conjunction with the image 103 is the prevention of someone "faking" the imager 102 acting alone by taking an image 103 of a picture of the user 101, rather than the user 101 themselves. Illustrating by example, if only the imager 102 is used, a nefarious person trying to get unauthorized access to the electronic device 100 may simply snap a picture of a two-dimensional photograph of the user 101. The use of a depth scan 106 in conjunction with the image 103 prevents this type of chicanery by requiring that a three-dimensional object, i.e., the actual user 101, be present and within the predefined radius 104 before the authentication system 111 authenticates the user 101.

The opposite is also true. Use of only the depth imager 105, without the imager 102, is similarly problematic. If only the depth imager 105 is used, a nefarious actor attempting to gain unauthorized access to the electronic device 100 may create a three-dimensional, lifelike mask of the user 101. However, the use of the image 103 in conjunction with the depth scan 106 prevents this, as features of the user 101 that are hard to replicate with a mask are verified from the image 103, which is a RGB image in one or more embodiments. Features such as facial shape, nose shape, eye color, hair color, skin color, and so forth can be sufficiently verified by comparing the image 103 to the one or more predefined reference images 108. Advantageously, the use of the image in conjunction with the depth scan 106 prevents this type of chicanery by capturing a color two-dimensional image of the object, thereby confirming that the object looks like the user 101 in addition to being shaped like the user 101.

While the use of both the image 103 and the depth scan 106 as combined authentication factors is far superior to using one or the other alone, as noted above it is contemplated that a nefarious actor may take even more desperate steps attempt to "spoof" the system 111 if the information stored within the electronic device 100 is sufficiently valuable. Consider the situation where the malefactor goes to the extreme of making a three-dimensional mask of the authorized user with Hollywood-caliber hair and make up so that it is not only shaped like the user 101, but looks like the user 101 as well. While very expensive, such masks can be obtained when the stakes are sufficiently high. If only an image 103 and a depth scan 106 are required for the authentication system 111, this could conceivably result in unauthorized access to the electronic device 100 being obtained.

Advantageously, one or more embodiments of the present disclosure further require a thermal sensor 112 to detect an amount of thermal energy 113 received from an object within a thermal reception radius 114 of the electronic device 100. In one or more embodiments, only where the amount of thermal energy 113 received form the object is within a predefined temperature range 115 will authentication occur, and thus access be granted. Advantageously, this prevents the use of three-dimensional masks from "tricking" the authentication system by masquerading as the actual user 101, Buster. Thus, in one or more embodiments, the one or more processors 110 determine whether the amount of thermal energy 113 received from the object, which in this case is the user 101, is within the predefined temperature range 115.

In one or more embodiments, authentication 116 occurs where each of the following is true: the at least one image 103 sufficiently corresponds to at least one of the one or more predefined images 108; the at least one depth scan 106 sufficiently corresponds to at least one of the one or more predefined facial maps 109; and the amount of thermal energy 113 received from the object is within the predefined temperature range 115. Where all three are true, in one or more embodiments, the object is authenticated 117 as the user 101 authorized to use the electronic device 100.

In one or more embodiments, when the authentication 116 fails, for whatever reason, the one or more processors 110 can lock 117 or limit full access the electronic device 100 to preclude access to it or the information stored therein. For example, if the at least one image 103 fails to sufficiently correspond to at least one of the one or more predefined images 108 the one or more processors 110 can lock 117 the electronic device 100 to preclude access to it or reduce access or the information stored therein. Similarly, if the at least one depth scan 106 fails to correspond to at least one of the one or more predefined facial maps 109, the one or more processors 110 can lock 117 the electronic device 100 to preclude access to it or the information stored therein. If a mask is being used to spoof the system 111, and the amount of thermal energy 113 received from the object fails to fall within the predefined temperature range 115, the one or more processors 110 can lock 117 the electronic device 100 to preclude access to it or the information stored therein. When the electronic device 100 is locked, the one or more processors 110 may then require additional authentication factors beyond the image 103, the depth scan 106, and the amount of thermal energy 113 to authenticate the user 101 at the next authentication cycle.

As noted above, in one embodiment the imager 102 captures a single image 103 of the object, while in other embodiments the imager 102 captures a plurality of images 103,118 of the object. Similarly, the depth imager 105 can capture a single depth scan 106 of the object in one embodiment, while in other embodiments the depth imager 105 captures a plurality of depth scans 106,119 of the object.

The use of either the plurality of images 103,118 or the plurality of depth scans 106,119 advantageously allows additional authentication factors to be integrated into the system 111. Illustrating by example, the use of either the plurality of images 103,118 or the plurality of depth scans 106,119 allows for the detection of movement of the object between instances of either the plurality of images 103,118 or the plurality of depth scans 106,119.

Recall from above, that some truly nefarious actors may take the time, spend the capital, and consume the resources to create a heated, i.e., warm, three-dimensional model or mask of the user 101 in an effort to trick the combined imager 102, depth imager 105, and thermal sensor 112 authentication system 111. Advantageously, the use of either the plurality of images 103,118 or the plurality of depth scans 106,119 precludes such acts of nefariousness.

Illustrating by example, in one or more embodiments, the use of either the plurality of images 103,118 or the plurality of depth scans 106,119 allows the one or more processors 110 to detect motion between instances of either the plurality of images 103,118 or the plurality of depth scans 106,119. In one or more embodiments, the authentication system 111 requires movement of the object between instances of either the plurality of images 103,118 or the plurality of depth scans 106,119 prior to authentication 116 occurring.

Examples of movement include both the object moving in three-dimensional space and movement of the object's features while the object itself remains stationary in three-dimensional space. Illustrating by example, one "movement" between instances of either the plurality of images 103,118 or the plurality of depth scans 106,119 may comprise a change in facial expression of the user 101. The user 101 may initially have an open mouth in a first instance of either the plurality of images 103,118 or the plurality of depth scans 106,119, while having a closed mouth in a second instance of either the plurality of images 103,118 or the plurality of depth scans 106,119. Another example of movement may be a touch of the cheek. Another example may be closing one or both eyes. Another example might be removing the user's glasses between instances of either the plurality of images 103,118 or the plurality of depth scans 106,119. Another example might be changing the distance between the user 101 and the electronic device 100 between instances of either the plurality of images 103,118 or the plurality of depth scans 106,119. Still another example might be blowing out one's cheeks between instances of either the plurality of images 103,118 or the plurality of depth scans 106,119. These are illustrations only, as other examples of movement of the user 101 while the user 101 remains stationary will be obvious to those of ordinary skill in the art having the benefit of this disclosure.

Movement may also include moving the electronic device 100 relative to the user 101 between instances of either the plurality of images 103,118 or the plurality of depth scans 106,119. For instance, the first instance of either the plurality of images 103,118 or the plurality of depth scans 106,119 may capture a frontal view of the user's face 107. A second instance of either the plurality of images 103,118 or the plurality of depth scans 106,119 may then capture a profile view of the user's face 107. Where this occurs, the one or more pretended images 108 or predefined facial maps 109 will include instances from both angles.

Movement may also include both the user 101 and the electronic device 100 moving in three-dimensional space. For example, the user 101 may capture a first instance of either the plurality of images 103,118 or the plurality of depth scans 106,119 while standing next to a tree, with a second instance of either the plurality of images 103,118 or the plurality of depth scans 106,119 being with the user 101 standing next to a park bench, and so forth. Where this occurs, the one or more predefined images 108 or predefined facial maps 109 will include this user-defined background information as a requirement for authentication 116 to occur in one or more embodiments.

Accordingly, in one or more embodiments motion between instances of either the plurality of images 103,118 or the plurality of depth scans 106,119 is also required in addition to the at least one image 103 sufficiently corresponding to at least one of the one or more predefined images 108, the at least one depth scan 106 sufficiently corresponding to at least one of the one or more predefined facial maps 109, and the amount of thermal energy 113 received from the object falling within the predefined temperature range 115. In one or more embodiments, the one or more processors 110 determine whether there is movement of the object between at least a first image 103 and a second image 118 of the plurality of images 103,118. When there is, and the at least one image 103 sufficiently corresponds to at least one of the one or more predefined images 108, the at least one depth scan 106 sufficiently corresponds to at least one of the one or more predefined facial maps 109, and the amount of thermal energy 113 received from the object falls within the predefined temperature range 115, the authentication 116 occurs in one or more embodiments. Similarly, in another embodiment, the one or more processors 110 determine whether there is movement of the object between at least a first depth scan 106 and a second depth scan 119 of the plurality of depth scans 106,119. When there is, and the at least one image 103 sufficiently corresponds to at least one of the one or more predefined images 108, the at least one depth scan 106 sufficiently corresponds to at least one of the one or more predefined facial maps 109, and the amount of thermal energy 113 received from the object falls within the predefined temperature range 115, the authentication 116 occurs in one or more embodiments.

Of course, a combination of motion in the plurality of images 103,118 and in the plurality of depth scans 106,119 can be used as well. Regardless of whether one or both are used, in one or more embodiments, the authentication 116 only occurs where there is movement of the object. This prevents the use of a warm, three-dimensional model or mask of the user 101 spoofing the combined imager 102, depth imager 105, and thermal sensor 112 authentication system 111 in one or more embodiments.

The use of either the plurality of images 103,118 or the plurality of depth scans 106,119 offers other advantages as well, in that still more authentication factors to be integrated into the system 111. Illustrating by example, the use of either the plurality of images 103,118 or the plurality of depth scans 106,119 allows for different fields of view to be captured in instances of either the plurality of images 103,118 or the plurality of depth scans 106,119.

Using the plurality of images 103,118 as an example, in one embodiment at least a first image 103 of the plurality of images 103,118 is captured with a first field of view, while at least a second image 118 of the plurality of images 103,118 is captured with a second field of view. In one or more embodiments, the first field of view and the second field of view are different. Illustrating by example, in one embodiment the first field of view is wider than the second field of view. In another embodiment, the second field of view is narrower than the first field of view.

Different authentication factors can be obtained from different images having different fields of view. Illustrating by example, when a user 101 is being authenticated, in addition to the aforementioned facial, depth, and temperature authentication, and the plurality of images 103,118 is captured. A first image 103 of the plurality of images 103,118 can be taken at a wide field of view to show the user's entire body. Information such as whether the user 101 is physically touching or holding the electronic device 100 can be ascertained from such an image 103. This information further confirms that the user 101 is indeed a person, and not a warm, three-dimensional model or mask of the user 101 intended to spoof the system 111. After the first image 103 is captured, at least one other image 118 can be captured at a narrower field of view so as to frame only of the user's face 107 for authentication 116.

Thus, in one or more embodiments the first field of view is wider than the second field of view. The one or more processors 110 then determine, from the at least a first image 103, whether the object is touching the electronic device 100. Accordingly, in one or more embodiments the authenticating 117 occurs only when the at least one image 103 sufficiently corresponds to at least one of the one or more predefined images 108, the at least one depth scan 106 sufficiently corresponds to at least one of the one or more predefined facial maps 109, the amount of thermal energy 113 received from the object falls within the predefined temperature range 115, and the object is touching the electronic device 100. Instead of or in addition to using the plurality of images 103,118, the plurality of depth scans 106,119 can be used in similar fashion.

Similarly, in one embodiment a first image 103 of the plurality of images 103,118 can be taken at a narrow field of view to show and/or focus only an iris of the user 101 to perform a retinal scan. Information such the retinal pattern of the eye can be ascertained from such an image 103. This information further confirms that the user 101 is indeed an authorized user with an iris, and not a warm, three-dimensional model or mask of the user 101 intended to spoof the system 111. After the first image 103 is captured, at least one other image 118 can be captured at a wider field of view so as to frame the user's face 107 for facial recognition operations. Accordingly, in one or more embodiments the authenticating 117 occurs only when the at least one image 103 sufficiently corresponds to at least one of the one or more predefined images 108, the at least one depth scan 106 sufficiently corresponds to at least one of the one or more predefined facial maps 109, the amount of thermal energy 113 received from the object falls within the predefined temperature range 115, and the a retinal scan sufficiently corresponds to one or more predefined retinal scans stored within the electronic device 100. Instead of or in addition to using the plurality of images 103,118, the plurality of depth scans 106,119 can be used in similar fashion. Other authentication techniques, benefits, and features offered by systems configured in accordance with the disclosure will be described below. Still others will be obvious to those of ordinary skill in the art having the benefit of this disclosure.

In one or more embodiments, the one or more processors 110 associated with the authentication system 111 can be configured to determine, from one of the one or more images 103,118 or one or more depth scans 106,119 a mien expressed by the object. As used herein, "mien" takes the ordinary English definition of a person's look or manner, especially one of a particular kind indicating their character or mood. As used with the authentication system, a mien is an intentional facial or bodily pose or position in which the user places their face or body.

Illustrating by example, rather than staring blankly at the electronic device 100 for authentication, in one or more embodiments the user 101 can adopt a particular mien intentionally as a secret password. This mien is known only to the user 101. In one or more embodiments, authentication does not occur unless the mien is expressed. Accordingly, in one or more embodiments the authenticating 117 occurs only when the at least one image 103 sufficiently corresponds to at least one of the one or more predefined images 108, the at least one depth scan 106 sufficiently corresponds to at least one of the one or more predefined facial maps 109, the amount of thermal energy 113 received from the object falls within the predefined temperature range 115, and the user 101 is expressing a predefined mien as identified using one or more of the plurality of images 103,118 or one or more of the plurality of depth scans 106,119.

Examples of miens include one of one or more raised eyebrows, one or more closed eyes, one or more fingers touching a face, forcing the mouth open, closing the mouth with a smile or frown, making an intentionally happy face, making an intentionally sad face, pulling the hair, or orienting the face 107 in a particular direction, such as a profile view. Other examples of miens include looking up or looking down or standing in front of a structure, a door, a car, in bright light, and so forth. Other examples of miens will be obvious to those of ordinary skill in the art having the benefit of this disclosure.

In the illustrative embodiment of FIG. 1, the user 101 is expressing a mien by raising one eyebrow 120 higher than the other. This is identified from either one or more of the plurality of images 103,118 or one or more of the plurality of depth scans 106,119. In one or more embodiments, the authenticating 117 occurs only when the mien sufficiently corresponds to a predefined mien stored in memory with at least one of the one or more predefined images 108 or at least one of the one or more predefined facial maps 109.

In one or more embodiments, the authentication system 111 can determine a distance between the object and the electronic device 100. For example, in one embodiment the authentication system 111, using the scaling form the image 103 or the distance calculated using the depth scan 106, can determine how far the electronic device 100 is from the user's face 107. In such an embodiment, the authentication 116 can occur only when the determined distance is within a predefined range. For example, in one or more embodiments the image, depth scan, and temperature must be captured within a predefined range definable by a user in a device menu, e.g., between a distance of one and two feet, for authentication 116 to successfully occur. This could be driven by environmental conditions where user motion, background darkness, or crowd presence shortens maximum distance for triggering authentication. Accordingly, in one or more embodiments the authenticating 117 occurs only when the at least one image 103 sufficiently corresponds to at least one of the one or more predefined images 108, the at least one depth scan 106 sufficiently corresponds to at least one of the one or more predefined facial maps 109, the amount of thermal energy 113 received from the object falls within the predefined temperature range 115, and the determined distance between the user 101 and the electronic device 100 is within a predefined distance range, such as between one and two feet.

In other embodiments, device orientation can be used as an authentication factor. For example, detecting whether the electronic device 100 is oriented so as to capture a "selfie," as shown in FIG. 1, or an image from the rear imager prevents someone from getting access to an electronic device 100, pointing it in the direction of the authorized user, capturing a rearward shot, and obtaining access to the electronic device 100. Accordingly, in one or more embodiments the authenticating 117 occurs only when the at least one image 103 sufficiently corresponds to at least one of the one or more predefined images 108, the at least one depth scan 106 sufficiently corresponds to at least one of the one or more predefined facial maps 109, the amount of thermal energy 113 received from the object falls within the predefined temperature range 115, and the orientation of the electronic device 100 matches one or more predefined orientation criteria, such as the fact that the image 103 is a selfie and not one captured by a rearward facing camera.

Other authentication factors will be described below. Still others will be obvious to those of ordinary skill in the art having the benefit of this disclosure.

Figure 2:
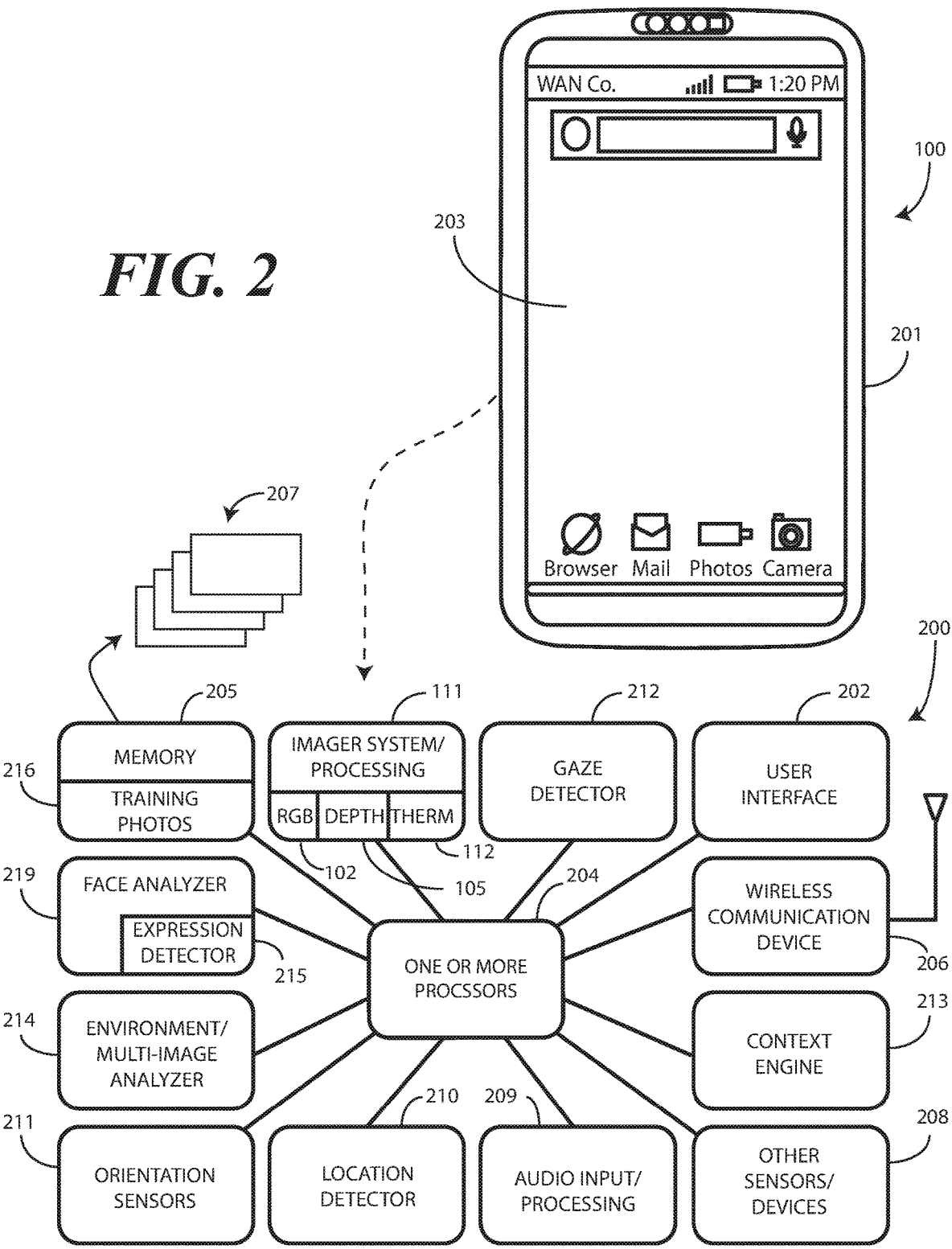
FIG. 2 illustrates one explanatory system in accordance with one or more embodiments of the disclosure.

Turning now to FIG. 2, illustrated therein is one explanatory block diagram schematic 200 of one explanatory electronic device 100 configured in accordance with one or more embodiments of the disclosure. The electronic device 100 can be one of various types of devices. In one embodiment, the electronic device 100 is a portable electronic device, one example of which is a smartphone that will be used in the figures for illustrative purposes. However, it should be obvious to those of ordinary skill in the art having the benefit of this disclosure that the block diagram schematic 200 could be used with other devices as well, including conventional desktop computers, palm-top computers, tablet computers, gaming devices, media players, wearable devices, or other devices. Still other devices will be obvious to those of ordinary skill in the art having the benefit of this disclosure.

In one or more embodiments, the block diagram schematic 200 is configured as a printed circuit board assembly disposed within a housing 201 of the electronic device 100. Various components can be electrically coupled together by conductors or a bus disposed along one or more printed circuit boards.

The illustrative block diagram schematic 200 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

The illustrative block diagram schematic 200 includes a user interface 202. In one or more embodiments, the user interface 202 includes a display 203, which may optionally be touch-sensitive. In one embodiment, users can deliver user input to the display 203 of such an embodiment by delivering touch input from a finger, stylus, or other objects disposed proximately with the display 203. In one embodiment, the display 203 is configured as an active matrix organic light emitting diode (AMOLED) display. However, it should be noted that other types of displays, including liquid crystal displays, suitable for use with the user interface 202 would be obvious to those of ordinary skill in the art having the benefit of this disclosure.

In one embodiment, the electronic device includes one or more processors 204. In one embodiment, the one or more processors 204 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 200. Each of the application processor and the auxiliary processor(s) can be configured to process and execute executable software code to perform the various functions of the electronic device with which the block diagram schematic 200 operates. A storage device, such as memory 205, can optionally store the executable software code used by the one or more processors 204 during operation.

In this illustrative embodiment, the block diagram schematic 200 also includes a communication circuit 206 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. The communication circuit 206 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 206 can include wireless communication circuitry, one of a receiver, a transmitter, or transceiver, and one or more antennas.

In one embodiment, the one or more processors 204 can be responsible for performing the primary functions of the electronic device with which the block diagram schematic 200 is operational. For example, in one embodiment the one or more processors 204 comprise one or more circuits operable with the user interface 202 to present presentation information to a user. The executable software code used by the one or more processors 204 can be configured as one or more modules 207 that are operable with the one or more processors 204. Such modules 207 can store instructions, control algorithms, and so forth.

In one or more embodiments, the block diagram schematic 200 includes an audio input/processor 209. The audio input/processor 209 can include hardware, executable code, and speech monitor executable code in one embodiment. The audio input/processor 209 can include, stored in memory 218, basic speech models, trained speech models, or other modules that are used by the audio input/processor 209 to receive and identify voice commands that are received with audio input captured by an audio capture device. In one embodiment, the audio input/processor 209 can include a voice recognition engine. Regardless of the specific implementation utilized in the various embodiments, the audio input/processor 209 can access various speech models to identify speech commands.

In one embodiment, the audio input/processor 209 is configured to implement a voice control feature that allows a user to speak a specific device command to cause the one or more processors 204 to execute a control operation. For example, the user may say, "Authenticate Me Now." This statement comprises a device command requesting the one or more processors to cooperate with the authentication system 111 to authenticate a user. Consequently, this device command can cause the one or more processors 204 to access the authentication system 111 and begin the authentication process. In short, in one embodiment the audio input/processor 209 listens for voice commands, processes the commands and, in conjunction with the one or more processors 204, performs a touchless authentication procedure in response to voice input.

Various sensors can be operable with the one or more processors 204. FIG. 2 illustrates several examples such sensors. It should be noted that those shown in FIG. 2 are not comprehensive, as others will be obvious to those of ordinary skill in the art having the benefit of this disclosure. Additionally, it should be noted that the various sensors shown in FIG. 2 could be used alone or in combination. Accordingly, many electronic devices will employ only subsets of the sensors shown in FIG. 2, with the particular subset defined by device application.

A first example of a sensor that can be included with the other components 208 is a touch sensor. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 204, to detect an object in close proximity with—or touching—the surface of the display 203 or the housing of an electronic device 100 by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

Another example of a sensor is a geo-locator that serves as a location detector 210. In one embodiment, location detector 210 is able to determine location data when the touchless authentication process occurs by capturing the location data from a constellation of one or more earth orbiting satellites, or from a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLONASS) in Russia, and other similar satellite positioning systems. The satellite positioning systems based location fixes of the location detector 210 autonomously or with assistance from terrestrial base stations, for example those associated with a cellular communication network or other ground based network, or as part of a Differential Global Positioning System (DGPS), as is well known by those having ordinary skill in the art. The location detector 210 may also be able to determine location by locating or triangulating terrestrial base stations of a traditional cellular network, such as a CDMA network or GSM network, or from other local area networks, such as Wi-Fi networks.

One or more motion detectors can be configured as an orientation detector 211 that determines an orientation and/or movement of the electronic device 100 in three-dimensional space. Illustrating by example, the orientation detector 211 can include an accelerometer, gyroscopes, or other device to detect device orientation and/or motion of the electronic device 100. Using an accelerometer as an example, an accelerometer can be included to detect motion of the electronic device. Additionally, the accelerometer can be used to sense some of the gestures of the user, such as one talking with their hands, running, or walking.

The orientation detector 211 can determine the spatial orientation of an electronic device 100 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 100.

A gaze detector 212 can comprise sensors for detecting the user's gaze point. The gaze detector 212 can optionally include sensors for detecting the alignment of a user's head in three-dimensional space. Electronic signals can then be processed for computing the direction of user's gaze in three-dimensional space. The gaze detector 212 can further be configured to detect a gaze cone corresponding to the detected gaze direction, which is a field of view within which the user may easily see without diverting their eyes or head from the detected gaze direction. The gaze detector 212 can be configured to alternately estimate gaze direction by inputting images representing a photograph of a selected area near or around the eyes. It will be clear to those of ordinary skill in the art having the benefit of this disclosure that these techniques are explanatory only, as other modes of detecting gaze direction can be substituted in the gaze detector 212 of FIG. 2.

Other components 208 operable with the one or more processors 204 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 208 can also include proximity sensors. The proximity sensors fall in to one of two camps: active proximity sensors and "passive" proximity sensors. Either the proximity detector components or the proximity sensor components can be generally used for gesture control and other user interface protocols, some examples of which will be described in more detail below.

As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter. Illustrating by example, in one the proximity sensor components comprise a signal receiver to receive signals from objects external to the housing 201 of the electronic device 100. In one embodiment, the signal receiver is an infrared signal receiver to receive an infrared emission from an object such as a human being when the human is proximately located with the electronic device 100. In one or more embodiments, the proximity sensor component is configured to receive infrared wavelengths of about four to about ten micrometers. This wavelength range is advantageous in one or more embodiments in that it corresponds to the wavelength of heat emitted by the body of a human being.

Additionally, detection of wavelengths in this range is possible from farther distances than, for example, would be the detection of reflected signals from the transmitter of a proximity detector component. In one embodiment, the proximity sensor components have a relatively long detection range so as to detect heat emanating from a person's body when that person is within a predefined thermal reception radius. For example, the proximity sensor component may be able to detect a person's body heat from a distance of about ten feet in one or more embodiments. The ten-foot dimension can be extended as a function of designed optics, sensor active area, gain, lensing gain, and so forth.

Proximity sensor components are sometimes referred to as a "passive IR detectors" due to the fact that the person is the active transmitter. Accordingly, the proximity sensor component requires no transmitter since objects disposed external to the housing deliver emissions that are received by the infrared receiver. As no transmitter is required, each proximity sensor component can operate at a very low power level. Simulations show that a group of infrared signal receivers can operate with a total current drain of just a few microamps.

In one embodiment, the signal receiver of each proximity sensor component can operate at various sensitivity levels so as to cause the at least one proximity sensor component to be operable to receive the infrared emissions from different distances. For example, the one or more processors 204 can cause each proximity sensor component to operate at a first "effective" sensitivity so as to receive infrared emissions from a first distance. Similarly, the one or more processors 204 can cause each proximity sensor component to operate at a second sensitivity, which is less than the first sensitivity, so as to receive infrared emissions from a second distance, which is less than the first distance. The sensitivity change can be effected by causing the one or more processors 204 to interpret readings from the proximity sensor component differently.

By contrast, proximity detector components include a signal emitter and a corresponding signal receiver. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

The other components 208 can optionally include a barometer operable to sense changes in air pressure due to elevation changes or differing pressures of the electronic device 100. Where included, in one embodiment the barometer includes a cantilevered mechanism made from a piezoelectric material and disposed within a chamber. The cantilevered mechanism functions as a pressure sensitive valve, bending as the pressure differential between the chamber and the environment changes. Deflection of the cantilever ceases when the pressure differential between the chamber and the environment is zero. As the cantilevered material is piezoelectric, deflection of the material can be measured with an electrical current.

The other components 208 can also optionally include a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 100. Similarly, a temperature sensor can be configured to monitor temperature about an electronic device.

A context engine 213 can then operable with the various sensors to detect, infer, capture, and otherwise determine persons and actions that are occurring in an environment about the electronic device 100. For example, where included one embodiment of the context engine 213 determines assessed contexts and frameworks using adjustable algorithms of context assessment employing information, data, and events. These assessments may be learned through repetitive data analysis. Alternatively, a user may employ the user interface 202 to enter various parameters, constructs, rules, and/or paradigms that instruct or otherwise guide the context engine 213 in detecting multi-modal social cues, emotional states, moods, and other contextual information.

The context engine 213 can comprise an artificial neural network or other similar technology in one or more embodiments.

In one or more embodiments, the context engine 213 is operable with the one or more processors 204. In some embodiments, the one or more processors 204 can control the context engine 213. In other embodiments, the context engine 213 can operate independently, delivering information gleaned from detecting multi-modal social cues, emotional states, moods, and other contextual information to the one or more processors 204. The context engine 213 can receive data from the various sensors. In one or more embodiments, the one or more processors 204 are configured to perform the operations of the context engine 213.

As previously described, the authentication system 111 includes an imager 102, a depth imager 105, and a thermal sensor 112. In one embodiment, the imager 102 comprises a two-dimensional imager configured to receive at least one image of a person within an environment of the electronic device 100. In one embodiment, the imager 102 comprises a two-dimensional RGB imager. In another embodiment, the imager 102 comprises an infrared imager. Other types of imagers suitable for use as the imager 102 of the authentication system will be obvious to those of ordinary skill in the art having the benefit of this disclosure.

The thermal sensor 112 can also take various forms. In one embodiment, the thermal sensor 112 is simply a proximity sensor component included with the other components 208. In another embodiment, the thermal sensor 112 comprises a simple thermopile. In another embodiment, the thermal sensor 112 comprises an infrared imager that captures the amount of thermal energy emitted by an object. Other types of thermal sensors 112 will be obvious to those of ordinary skill in the art having the benefit of this disclosure.

The depth imager 105 can take a variety of forms. Turning briefly to FIG. 3, illustrated therein are three different configurations of the authentication system 111, each having a different depth imager 105.

In a first embodiment 301, the depth imager 304 comprises a pair of imagers separated by a predetermined distance, such as three to four images. This "stereo" imager works in the same way the human eyes do in that it captures images from two different angles and reconciles the two to determine distance.

In another embodiment 302, the depth imager 305 employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment 303, the depth imager 306 comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained. Regardless of embodiment, the depth imager 304,305,306 adds a third "z-dimension" to the x-dimension and y-dimension defining the two-dimensional image captured by the imager 102, thereby enhancing the security of using a person's face as their password in the process of authentication by facial recognition.

Turning back to FIG. 2, the authentication system 111 can be operable with a face analyzer 219 and an environmental analyzer 214. The face analyzer 219 and/or environmental analyzer 214 can be configured to process an image or depth scan of an object and determine whether the object matches predetermined criteria. For example, the face analyzer 219 and/or environmental analyzer 214 can operate as an identification module configured with optical and/or spatial recognition to identify objects using image recognition, character recognition, visual recognition, facial recognition, color recognition, shape recognition, and the like. Advantageously, the face analyzer 219 and/or environmental analyzer 214, operating in tandem with the authentication system 111, can be used as a facial recognition device to determine the identity of one or more persons detected about the electronic device 100.

Illustrating by example, in one embodiment when the authentication system 111 detects a person, one or both of the imager 102 and/or the depth imager 105 can capture a photograph and/or depth scan of that person. The authentication system 111 can then compare the image and/or depth scan to one or more reference files stored in the memory 205. This comparison, in one or more embodiments, is used to confirm beyond a threshold authenticity probability that the person's face—both in the image and the depth scan—sufficiently matches one or more of the reference files.

Beneficially, this optical recognition performed by the authentication system 111 operating in conjunction with the face analyzer 219 and/or environmental analyzer 214 allows access to the electronic device 100 only when one of the persons detected about the electronic device are sufficiently identified as the owner of the electronic device 100. Accordingly, in one or more embodiments the one or more processors 204, working with the authentication system 111 and the face analyzer 219 and/or environmental analyzer 214 can determine whether at least one image captured by the imager 102 matches a first predefined criterion, whether at least one facial depth scan captured by the depth imager 105 matches a second predefined criterion, and whether the thermal energy identified by the thermal sensor 112 matches a third predefined criterion, with the first criterion, second criterion, and third criterion being defined by the reference files and predefined temperature range. The first criterion may be a skin color, eye color, and hair color, while the second criterion is a predefined facial shape, ear size, and nose size. The third criterion may be a temperature range of between 95 and 101 degrees Fahrenheit. In one or more embodiments, the one or more processors 204 authenticate a person as an authorized user of the electronic device when the at least one image matches the first predefined criterion, the at least one facial depth scan matches the second predefined criterion, and the thermal energy matches the third predefined criterion.

In one or more embodiments, the face analyzer 219 and/or environmental analyzer 214 is configured to identify an expressed mien from at least one image and/or at least one facial depth scan. In one embodiment, authentication occurs only when the expressed mien matches a fourth predefined criterion. As noted above, examples of expressed miens include one of one or more raised eyebrows, one or more closed eyes, one or more fingers touching a face, an opened mouth, looking up, looking down, looking to the right, looking to the left, or being situated adjacent to a predefined object. As such, in one or more embodiments the one or more processors 204 authenticate a person as an authorized user of the electronic device when the at least one image matches the first predefined criterion, the at least one facial depth scan matches the second predefined criterion, and the thermal energy matches the third predefined criterion, and when the expressed mien matches a fourth predefined criterion.

In one or more embodiments, a user can "train" the electronic device 100 by storing predefined miens 295 in the face analyzer 219 or reference photos in the memory 205 of the electronic device 100. Illustrating by example, a user may take a series of pictures. These can include specifically articulated miens. They can include depth looking in different directions. They can include making a sweep with the electronic device 100 such as from top to bottom or left to right about the face. They can also include identifiers of special features such as eye color, sink color, air color, weight, and height. They can include the user standing in front of a particular wall, which is identifiable by the environmental analyzer from images captured by the imager 102. They can include the user raisin a hand or looking in one direction, such as in a profile view. The miens can include raised eyebrows or one eye closed or an open mouth or a finger touching the chin. These are merely examples of items that can be stored in the reference images. Others will be readily obvious to those of ordinary skill in the art having the benefit of this disclosure. Any of these can constitute the fourth criterion from the preceding paragraph.

Additionally, the reference features can store one or more facial features, such as a bent nose, scar, mole, beard, or tattoo. Where this occurs, the face analyzer 219 can detect such facial features from images captured by the imager 102. Accordingly, in one or more embodiments the one or more processors 204 authenticate a person as an authorized user of the electronic device when the at least one image matches the first predefined criterion, the at least one facial depth scan matches the second predefined criterion, and the thermal energy matches the third predefined criterion, and one or more facial features sufficiently match one or more predefined facial features stored within the reference images in the memory 216 of the electronic device 100. With passage of time, user features can slowly change. These changes are used to update system and stored samples. For example, if the user lost a tooth, has a tattoo that is washing out, has hair that is getting grey, or other changes, the system can be updated accordingly. In one embodiment, the system is updated manually. In other embodiments, the system can automatically update after the user confirms their credentials.

Additionally, in or more embodiments the imager 102 and/or depth imager 105 is configured to capture multiple images and/or multiple depth scans. In one or more embodiments, the face analyzer 219 and/or environmental analyzer 214 is configured to detect movement of the person between the first image and the second image. As noted above, movement can include motion of the person while remaining in the same location, e.g., a change in facial expression, a touch of the cheek, a new orientation of the electronic device relative to the user, and so forth. Motion can include blinking, opening or closing the mouth, raising the eyebrows, changing posture, moving the head relative to the neck, and so forth.

Examples of movement can also include both the person moving in three-dimensional space and movement of the person's features. One example might be removing the user's glasses while walking between images or depth scans. Another example might be winking while changing the distance between the user and the electronic device 100 between images or depth scans. Still another example might be blowing out one's cheeks while stepping backwards between images or depth scans. These are illustrations only, as other examples of movement will be obvious to those of ordinary skill in the art having the benefit of this disclosure.

Movement may also include moving the electronic device 100 relative to the user between images or depth scans. For instance, a first image or depth scan may capture a frontal view of the user's face, while a second image or depth scan may then capture a profile view of the user's face. Movement may also include both the user and the electronic device 100 moving in three-dimensional space. For example, the user may capture a first image or depth scan while standing next to a tree, with a second image or depth scan being while standing next to a park bench, and so forth. As such, in one or more embodiments the one or more processors 204 authenticate a person as an authorized user of the electronic device when the at least one image matches the first predefined criterion, the at least one facial depth scan matches the second predefined criterion, and the thermal energy matches the third predefined criterion, and only when movement of a person is detected between images or depth scans.

In one or more embodiments, the face analyzer 219 can also include an image/gaze detection-processing engine. The image/gaze detection-processing engine can process information to detect a user's gaze point. The image/gaze detection-processing engine can optionally also work with the depth scans to detect an alignment of a user's head in three-dimensional space. Electronic signals can then be delivered from the imager 102 or the depth imager 105 for computing the direction of user's gaze in three-dimensional space. The image/gaze detection-processing engine can further be configured to detect a gaze cone corresponding to the detected gaze direction, which is a field of view within which the user may easily see without diverting their eyes or head from the detected gaze direction. The image/gaze detection-processing engine can be configured to alternately estimate gaze direction by inputting images representing a photograph of a selected area near or around the eyes. It can also be valuable to determine if the user wants to be authenticated by looking directly at device. The image/gaze detection-processing engine can determine not only a gazing cone but also if an eye is looking in a particular direction to confirm user intent to be authenticated.

In one or more embodiments, the face analyzer 219 is further configured to detect mood. The face analyzer 219 can infer a person's mood based upon contextual information received from the imager 102 and/or depth imager 105. For example, if a picture, a depth scan, multiple successive pictures, multiple successive depth scans, video, or other information from which a person can be identified as the owner of the electronic device 100 indicate that the owner is crying, the face analyzer 219 can infer that she is either happy or sad.

The face analyzer 219 can similarly determine emotion in one or more embodiments. Illustrating by example, a picture, a depth scan, multiple successive pictures, multiple successive depth scans, video, or other information relating to of the owner of an electronic device can allow the inference of their silently communicated emotional state, e.g. joy, anger, frustration, and so forth. This can be inferred from, for example, facial gestures such as a raised eyebrow, grin, or other feature. In one or more embodiments, such emotional cues can be used as a secret password for authentication in addition to the face.

Figure 4:
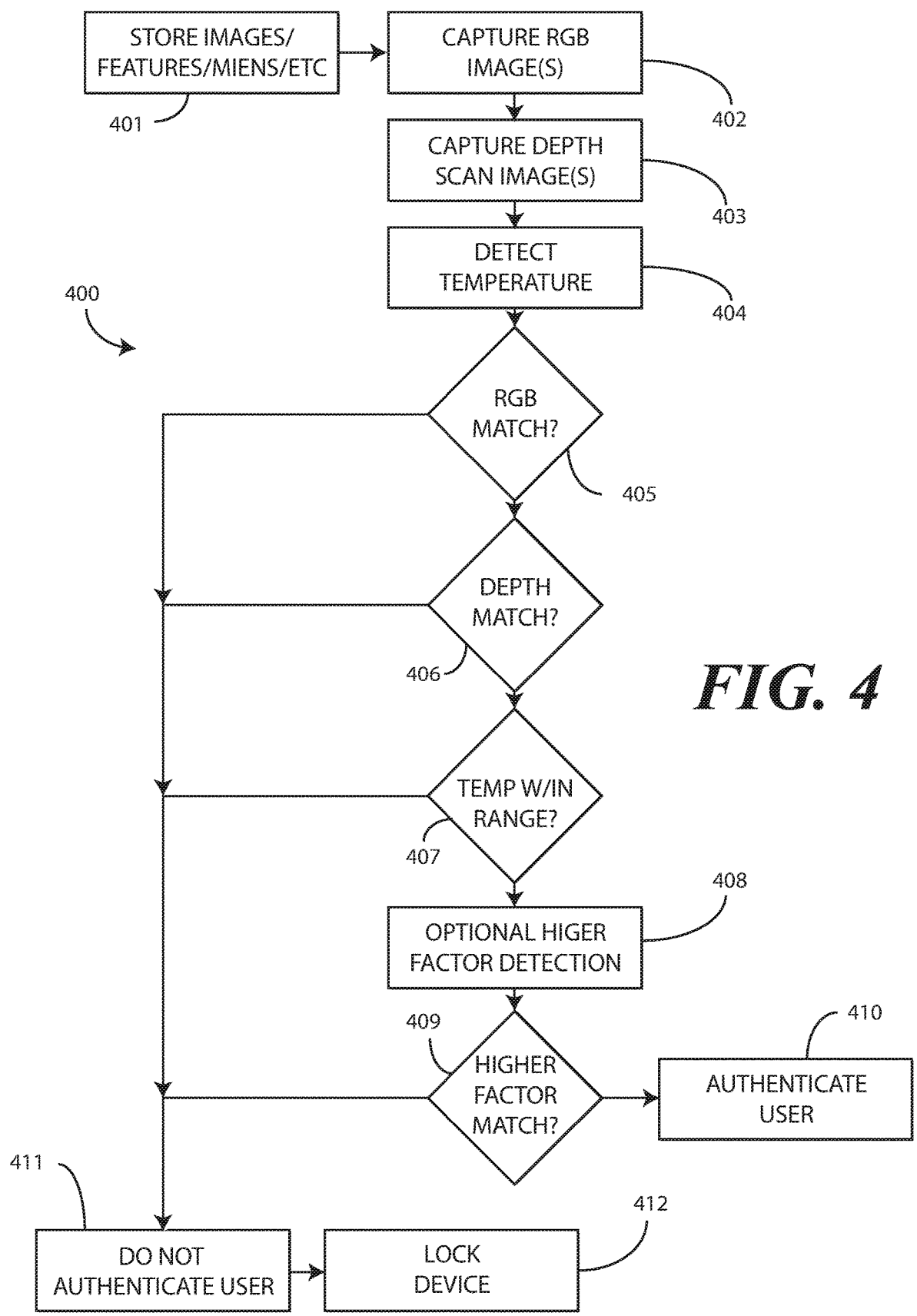
FIG. 4 illustrates one explanatory method in accordance with one or more embodiments of the disclosure.

Turning now to FIG. 4, illustrated therein is one explanatory method 400 in accordance with one or more embodiments of the disclosure. Beginning at optional step 401, the method 400 optionally includes storing, in a memory of an electronic device, predefined facial features of an authorized user of the electronic device. These predefined facial features include a predefined mien in one or more embodiments, as noted above. The predefined facial features may be stored by capturing one or more training images, one or more training facial scans, or combinations thereof.

At step 402, the method 400 includes capturing, with an imager, at least one image of a person within a vicinity of the electronic device. At step 403, the method includes scanning, with a depth imager, at least one facial depth scan of the person. At step 404, the method 400 includes detecting, with a temperature sensor, a temperature of the person.

At decision 405, the method 400 compares the at least one image captured at step 402 with predefined facial features. Such predefined facial features may be those stored at step 401.

At decision 406, the method 400 compares the facial depth scan with predefined facial features. Such predefined facial features may be those stored at step 401.

At decision 407, the method 400 includes determining whether the temperature obtained at step 404 is within a predefined range. In one or more embodiments, this predefined range is between 95 and 102 degrees Fahrenheit. Other predefined temperature ranges corresponding to human body temperatures will be obvious to those of ordinary skill in the art.

At step 408, the method 400 optionally checks additional "higher authentication" factors. Examples of these higher authentication factors are shown in FIG. 5.

Figure 5:
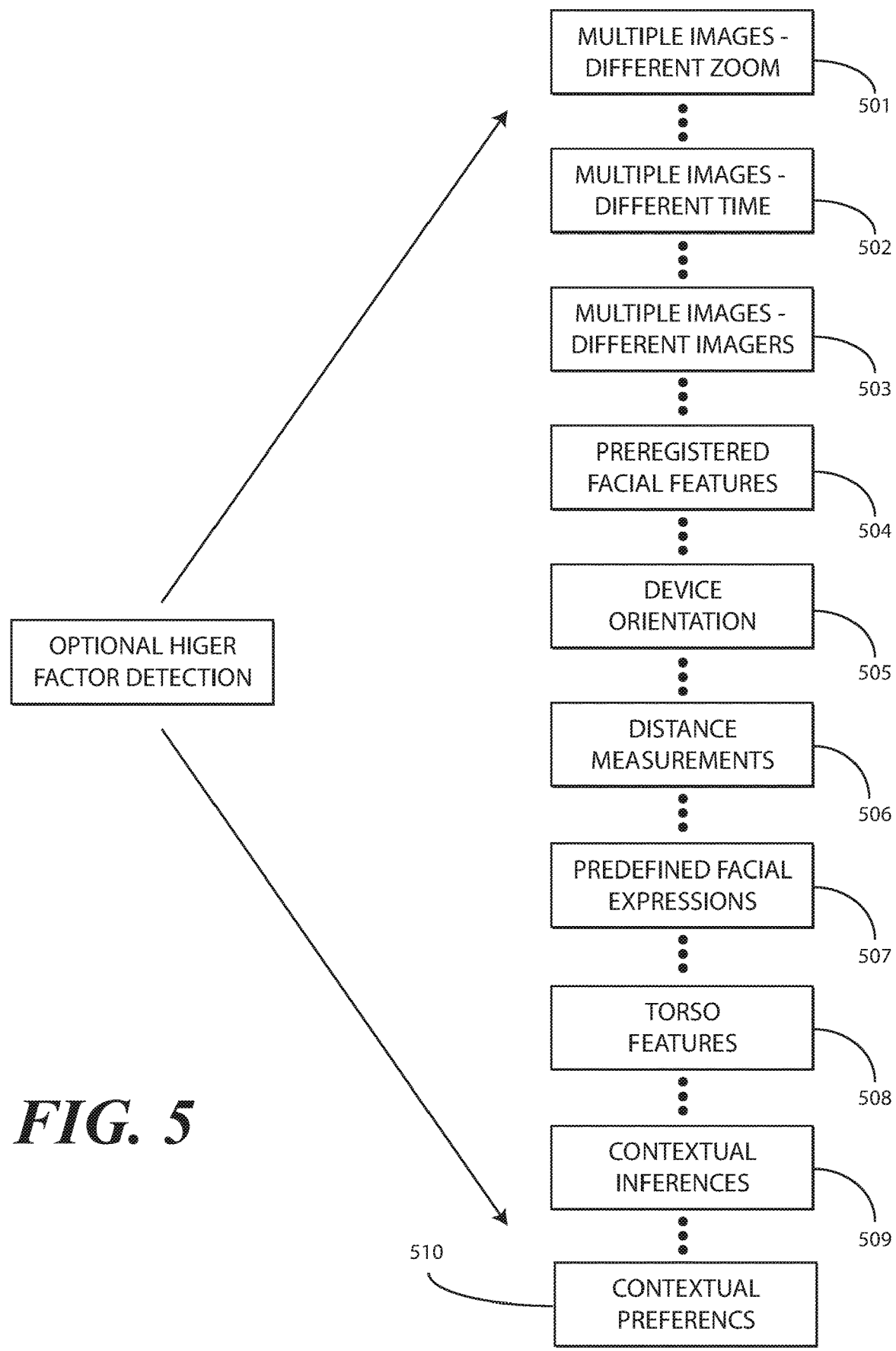
FIG. 5 illustrates one or more explanatory authentication factors suitable for use in methods and systems in accordance with one or more embodiments of the disclosure.

Turning briefly to FIG. 5, a first higher authentication factor 501 comprises capturing multiple images or multiple facial depth scans with different fields of view. Illustrating by example, in one or more embodiments at least a first image of a plurality of images is captured with a first field of view, while at least a second image of the plurality of images is captured with a second field of view. In one or more embodiments, the first field of view and the second field of view are different. For example, the first field of view may be wider than the second field of view. Such differing fields of view allow some images to be used, for example, for facial recognition, while other images can be used to determine, for example, whether a person is touching the electronic device. Similarly, the differing fields of view can be used to perform facial recognition with some images, and iris scans with others, and so forth.

A second higher authentication factor 502 may comprise a plurality of images and/or a plurality of facial depth scans across time, and performing authentication processes using each of these images and/or depth scans. When this occurs, frame rates can be triggered based upon variable criteria. For example, the frame rate to assess identity could be increase during motion and be reduced during stationary or motionless periods to conserve power. The frame rate can also be driven by lighting levels, with darkness triggering re-authentication and setting frame rate for best match. Additionally, re-authentication can be triggered by device motion. If, for example, the electronic device is placed on a table, re-authentication can be triggered when the device is picked up. Regardless of what form it takes, this "continuous" authentication and/or re-authentication ensures that the authorized user is using the device after access has been granted thereto. Where the authorized user stops using the device, or where another person starts using the device, such authentication would fail, returning to step (411) of the method (400) of FIG. 4.

A third higher authentication factor 503 can comprise capturing multiple images and/or depth cans with multiple imagers and/or multiple facial depth imagers performing authentication processes using each of these images and/or depth scans. This allows for authentication to occur from different angles and perspectives, further increasing robustness. Thus, in one or more embodiments at least a first image of the plurality of images is captured with a first imager oriented in a first direction and at least a second image of the plurality of images is captured with a second imager oriented in a second direction, wherein the first direction and the second direction are different. In one or more embodiments, a user controls, through the device menu, which camera is used, at what distance, at what device orientation, at what background condition, at what context, and at what device-user alignment authentication is to occur before touchless authentication can take place. These definitions can add security elements that are only known to authorized user.

A fourth higher authentication factor 504 can include identifying preregistered facial features. Characteristics such as a bent nose, scar, mole, beard, or tattoo can be preregistered in memory. Similarly, a user can store one or more predefined facial features such as hair color, eye color, skin color, head-to-neck size or diameter ratio, neck-to-body size or diameter ratio, location history, and so forth. In one or more embodiments, only when one or more of these predefined facial features are sufficiently matched will authentication occur. Where this occurs, authentication may occur only where one or more facial features sufficiently match one or more predefined facial features stored within a memory of an electronic device.

A fifth higher authentication factor 505 can be device orientation. If, for example, an orientation detector detects whether the device is oriented so as to capture a "selfie" rather than an image from the rear imager, this may confirm that the device is pointing in the direction of the authorized user, thereby allowing authentication. By contrast, capturing a rearward shot would not allow access to the device. This prevents someone from grabbing a device, pointing at the user, and running away with access to the device. Thus, in one or more embodiments an orientation of the electronic device is determined, authenticating occurs only when the orientation matches one or more predefined orientation criteria, such as the user capturing a selfie.

A sixth higher authentication factor 506 includes a distance measurement. In one or more embodiments, a predefined distance at which the image, depth scan, and temperature measurement are made can be required. For example, in one or more embodiments where the image, depth scan, and temperature are not captured within a predefined distance range, such as between a distance of one and two feet, authentication may not occur.

Figure 6:
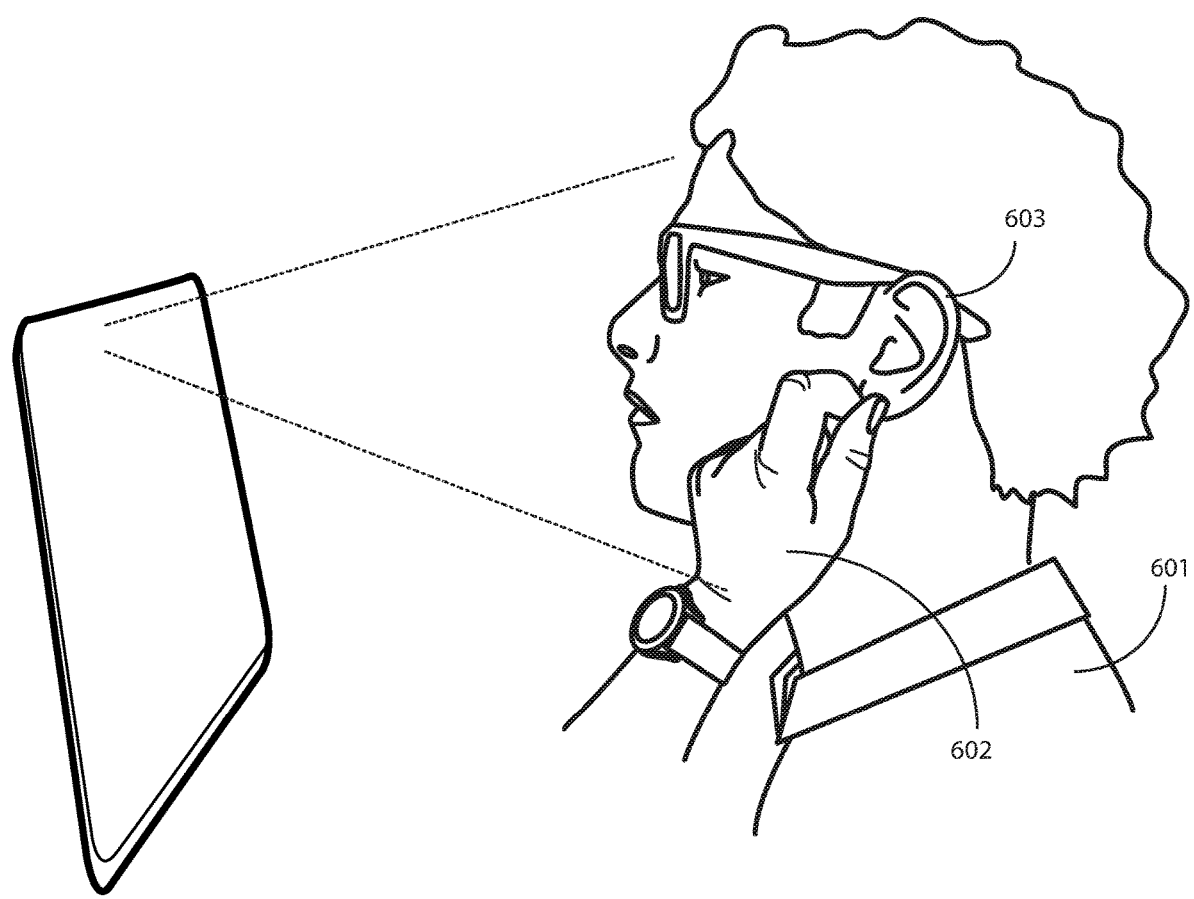
FIG. 6 illustrates one or more method steps for authenticating a user with an explanatory electronic device in accordance with one or more embodiments of the disclosure.

A seventh higher authentication factor 507 includes predefined miens. This has been described above. The same is shown in FIG. 6. Turning briefly to FIG. 6, a user 601 is expressing a mien by pulling on an ear 603 with a hand. In one or more embodiments where a mien is expressed, the authenticating occurs only when the mien sufficiently corresponds to a predefined mien stored in a memory.

Turning now back to FIG. 5, an eighth higher authentication factor 508 comprises a torso feature. This can include, for example, whether a person is physically touching the device or where the person is located, e.g., near a predefined wall, landmark, house, carrying a wallet, holding a picture, or situated next to other person.

Figure 7:
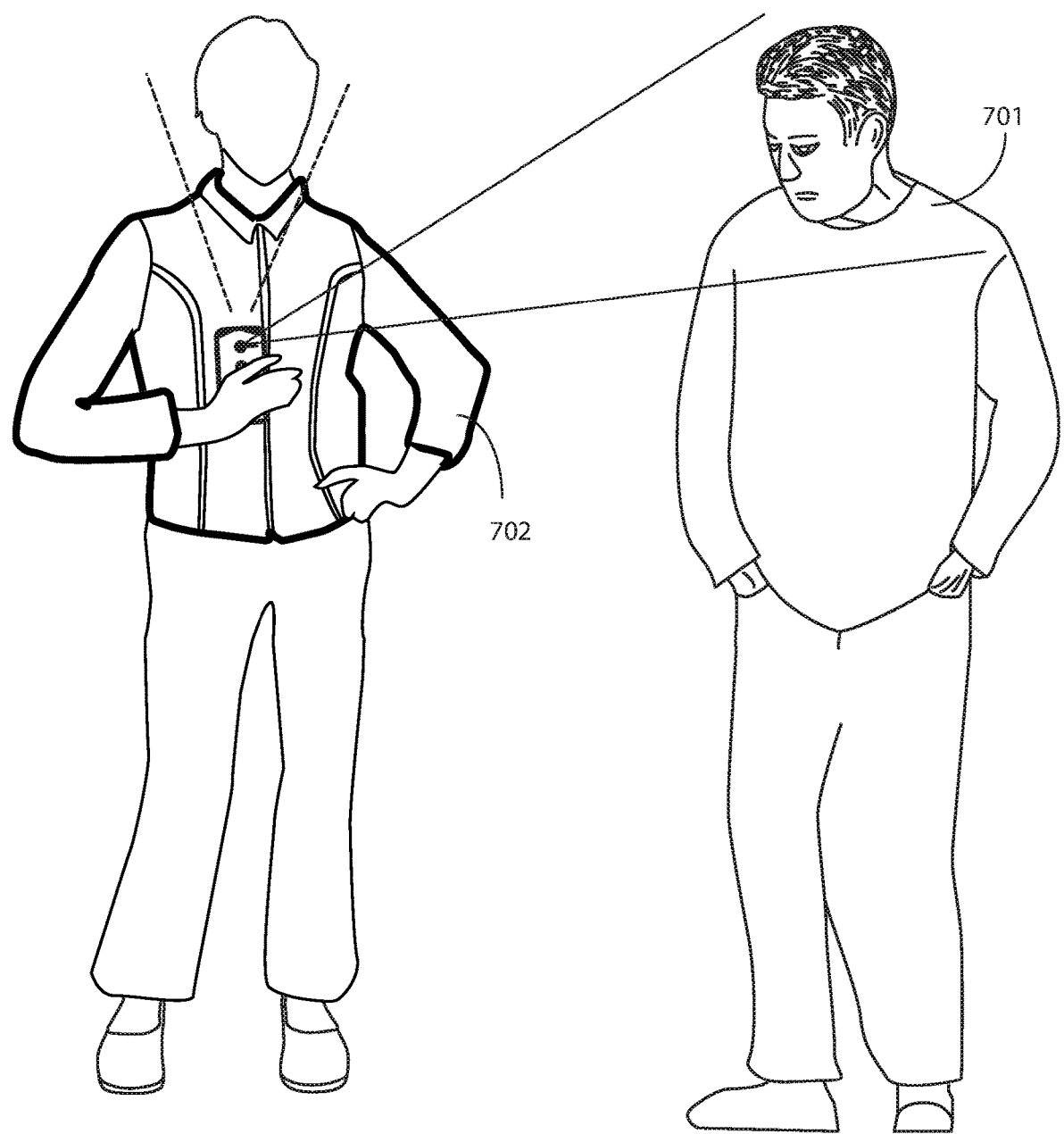
FIG. 7 illustrates one or more method steps in accordance with one or more embodiments of the disclosure.

A ninth higher authentication factor 509 can include contextual inferences. This can include, for example, differences between images captured by the front imager and the second imager. If, for instance, the front and rear imagers show only one person nearby, authentication can occur. However, as shown in FIG. 7, if another person 701 is in the picture, authentication may not occur due to the fact that there is a possibility that a fakir 702 is holding the device in front of an authorized user in an attempt to obtain access. Thus in one embodiment a number of people present in the at least a first image and the at least a second image is determined, and authenticating occurs only when a single person is present in the at least a first image and the at least a second image. Alternatively, under those conditions, system might elevate level of authentication required perhaps requiring user to enter a code or touch the fingerprint sensor.

A tenth higher authentication factor 510 can include user preferences, or contextual definitions provided by a user. Examples of these include whether the user is walking, laying down, sitting, looking to the side, resting face on hand, or has their hair brushed in a certain way.

Turning now back to FIG. 4, where higher authentication factors are used at step 408, they can be compared to reference points at decision 409. At step 410, authenticating a person as the authorized user occurs where the at least one image sufficiently matches some of the predefined facial features, the at least one facial depth scan sufficiently others of the predefined facial features, the temperature is within the predefined temperature range, and optionally the higher authentication factors sufficiently match the reference points. Otherwise, authentication is denied at step 411. The device can optionally be locked at step 412.

Figure 8:
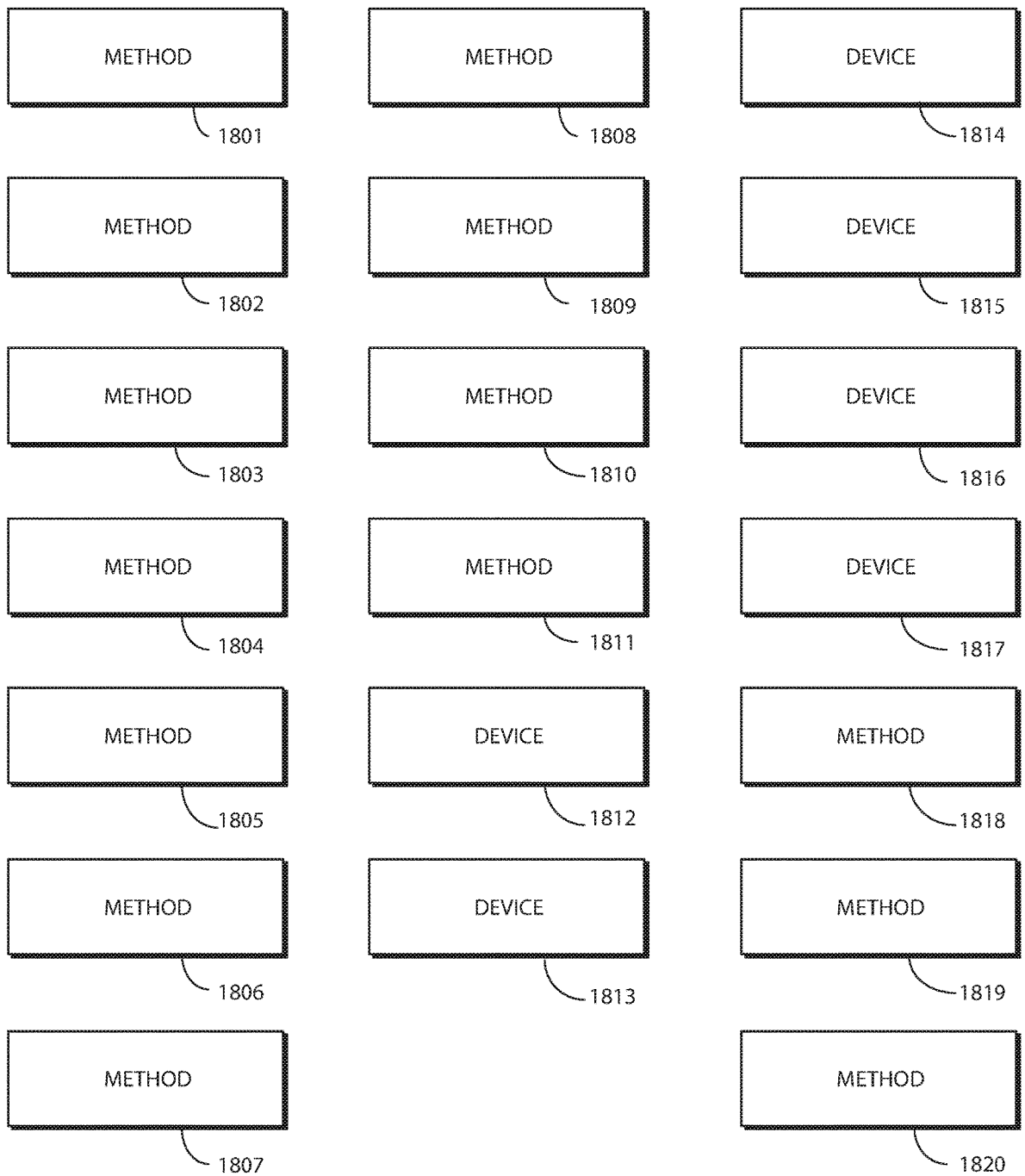
FIG. 8 illustrates one or more embodiments of the disclosure.

Turning now to FIG. 8, illustrated therein are various embodiments of the disclosure. At 801, a method in an electronic device includes capturing, with an imager, at least one image of an object. At 801, the method includes scanning, with a depth imager, at least one depth scan of the object. At 801, the method includes detecting, with a thermal sensor, an amount of thermal energy received from the object. At 801, the method includes comparing, with one or more processors the at least one image with one or more predefined reference images and the at least one depth scan with one or more predefined facial maps.

At 801, the method includes determining, with the one or more processors, whether the amount of thermal energy received from the object is within a predefined temperature range. At 801, and where the at least one image sufficiently corresponds to at least one of the one or more predefined images, the at least one depth scan corresponds to at least one of the one or more predefined facial maps, and the amount of thermal energy received from the object is within the predefined temperature range, the method includes authenticating the object as a user authorized to use the electronic device.

At 802, the at least one image of 801 comprises a plurality of images of the object. At 803, the at least one depth scan of 801 comprises a plurality of depth scans of the object.

At 804, the method of 803 further comprises determining, with the one or more processors whether there is movement of the object between at least a first image and a second image of the plurality of images or whether there is motion of the object between at least a first depth scan and a second depth scan of the plurality of depth scans. At 804, the authenticating occurs only where there is movement or motion of the object.

At 805, the at least a first image of the plurality of images of 802 is captured with a first field of view. At 805, at least a second image of the plurality of images of 802 is captured with a second field of view. At 805, the first field of view and the second field of view are different.

At 806, the first field of view of 805 is wider than the second field of view. At 806, the method of 805 further comprising determining, with the one or more processors from the at least a first image, whether the object is touching the electronic device. At 806, the authenticating occurs only when the object is touching the electronic device.

At 807, at least a first image of the plurality of images of 802 is captured with a first imager oriented in a first direction. At 807, at least a second image of the plurality of images of 802 is captured with a second imager oriented in a second direction. At 807, the first direction and the second direction are different.

At 808, the method of 807 further comprises determining, with the one or more processors, a number of people present in the at least a first image and the at least a second image. At 808, the authenticating occurs only when a single person is present in the at least a first image and the at least a second image.

At 809, the method of 801 further comprises determining, with an orientation sensor, an orientation of the electronic device. At 809, the authenticating occurs only when the orientation matches one or more predefined orientation criteria.

At 810, the method of 801 further comprises determining a distance of the object from the electronic device. At 810, the authenticating occurs only when the distance is within a predefined distance range.

At 811, the method of 801 further comprises determining, with the one or more processors from one or more of the at least one image and the at least one depth scan, a mien expressed by the object. At 811, the authenticating occurs only when the mien sufficiently corresponds to a predefined mien stored in a memory.

At 812, an electronic device comprises a two-dimensional imager receiving at least one image of a person within an environment of the electronic device. At 812, the electronic device comprises a three-dimensional imager receiving at least one facial depth scan of the person. At 812, the electronic device comprises a thermal sensor receiving thermal energy from the person. At 812, the electronic device comprises one or more processors operable with the two-dimensional imager, the three-dimensional imager, and the thermal sensor.

At 812, the one or more processors determine whether the at least one image matches a first predefined criterion, whether the at least one facial depth scan matches a second predefined criterion, and whether the thermal energy matches a third predefined criterion. At 812, the one or more processors authenticate the person as an authorized user of the electronic device when the at least one image matches the first predefined criterion, the at least one facial depth scan matches the second predefined criterion, and the thermal energy matches the third predefined criterion.

At 813, the one or more processors from 812 further identify an expressed mien from the at least one image or the at least one facial depth scan. At 813, the authenticating only occurs when the expressed mien match s a fourth predefined criterion.

At 814, the expressed mien of 813 is one of one or more raised eyebrows, one or more closed eyes, one or more fingers touching a face, an opened mouth, looking up, looking down, looking to the right, looking to the left, or being situated adjacent to or in the field of view of a predefined object.

At 815, the at least one image of 812 comprises a first image and a second image. At 815, the one or more processors of 812 detect movement of the person between the first image and the second image. At 815, the authenticating occurs only where movement of the person is detected.

At 816, the at least one image of 812 comprises a first image taken at a first field of view and a second image taken at a second field of view. At 816, the first field of view is wider than the second field of view.

At 817, the one or more processors of 812 further detect one or more facial features from the at least one image. At 817, the authenticating occurs only where the one or more facial features sufficiently match one or more predefined facial features stored within a memory of the electronic device.

At 818, a method comprises storing, in a memory of an electronic device, predefined facial features of an authorized user of the electronic device. At 818, the method comprises capturing, with an imager, at least one image of a person within a vicinity of the electronic device. At 818, the method comprises scanning, with a depth imager, at least one facial depth scan of the person. At 818, the method comprises detecting, with a temperature sensor, a temperature of the person. At 818, the method comprises comparing the at least one image and the at least one facial depth scan with the predefined facial features.

At 818, the method comprises determining whether the temperature is within a predefined temperature range. At 818, the method comprises authenticating the person as the authorized user where the at least one image sufficiently matches some of the predefined facial features, the at least one facial depth scan sufficiently others of the predefined facial features, and the temperature is within the predefined temperature range.

At 819, the method of 818 comprises determining, from one or more of the at least one image and the at least one facial depth scan, whether the person moves. At 819, the authenticating occurs only where the person moves. At 820, the method of 818 further comprises locking the electronic device upon failing to authenticate the person.

As shown and described, embodiments of the disclosure provide methods and systems for performing touchless authentication as a function of one or more two-dimensional images, one or more three-dimensional depth scans, and temperature information. Additional higher security factors can be employed as well, including an expressed mien, whether multiple people are present, an orientation of the device, from which direction the image(s) and depth scan(s) are captured, whether the person moves, whether the person is touching the device, whether the person is standing near an identifiable object such as a wall of their home or their mailbox, their location when the image(s) and depth scan(s) are captured, or other factors.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
   capturing, with an imager, at least one image of an object;
   scanning, with a depth imager, at least one depth scan of the object;
   detecting, with a thermal sensor, an amount of thermal energy received from the object;
   comparing, with one or more processors:
      the at least one image with one or more predefined reference images; and
      the at least one depth scan with one or more predefined facial maps;
   determining, with the one or more processors, whether the amount of thermal energy received from the object is within a predefined temperature range; and
   where:
      the at least one image sufficiently corresponds to at least one of the one or more predefined images;
      the at least one depth scan corresponds to at least one of the one or more predefined facial maps; and
      the amount of thermal energy received from the object is within the predefined temperature range;
   authenticating the object as a user authorized to use the electronic device.

2. The method of claim 1, wherein the at least one image comprises a plurality of images of the object.

3. The method of claim 2, wherein the at least one depth scan comprises a plurality of depth scans of the object.

4. The method of claim 3, further comprising determining, with the one or more processors:
   whether there is movement of the object between at least a first image and a second image of the plurality of images; or
   whether there is motion of the object between at least a first depth scan and a second depth scan of the plurality of depth scans;
   wherein the authenticating occurs only where there is movement or motion of the object.

5. The method of claim 2, wherein at least a first image of the plurality of images is captured with a first field of view and at least a second image of the plurality of images is captured with a second field of view, wherein the first field of view and the second field of view are different.

6. The method of claim 3, wherein the first field of view is wider than the second field of view, further comprising determining, with the one or more processors from the at least a first image, whether the object is touching the electronic device, wherein the authenticating occurs only when the object is touching the electronic device.

7. The method of claim 2, wherein at least a first image of the plurality of images is captured with a first imager oriented in a first direction and at least a second image of the plurality of images is captured with a second imager oriented in a second direction, wherein the first direction and the second direction are different.

8. The method of claim 7, further comprising determining, with the one or more processors, a number of people present in the at least a first image and the at least a second image, wherein the authenticating occurs only when a single person is present in the at least a first image and the at least a second image.

9. The method of claim 1, further comprising determining, with an orientation sensor, an orientation of the electronic device, wherein the authenticating occurs only when the orientation matches one or more predefined orientation criteria.

10. The method of claim 1, further comprising determining a distance of the object from the electronic device, wherein the authenticating occurs only when the distance is within a predefined distance range.

11. The method of claim 1, further comprising determining, with the one or more processors from one or more of the at least one image and the at least one depth scan, a mien expressed by the object, wherein the authenticating occurs only when the mien sufficiently corresponds to a predefined mien stored in a memory.

12. An electronic device, comprising:
a two-dimensional imager receiving at least one image of a person within an environment of the electronic device;
a three-dimensional imager receiving at least one facial depth scan of the person;
a thermal sensor receiving thermal energy from the person; and
one or more processors operable with the two-dimensional imager, the three-dimensional imager, and the thermal sensor, the one or more processors determining:
whether the at least one image matches a first predefined criterion;
whether the at least one facial depth scan matches a second predefined criterion; and
whether the thermal energy matches a third predefined criterion; and
authenticating the person as an authorized user of the electronic device when:
the at least one image matches the first predefined criterion;
the at least one facial depth scan matches the second predefined criterion; and
the thermal energy matches the third predefined criterion.

13. The electronic device of claim 12, the one or more processors further identifying an expressed mien from the at least one image or the at least one facial depth scan, wherein the authenticating only occurs when the expressed mien match s a fourth predefined criterion.

14. The electronic device of claim 13, wherein the expressed mien is one of one or more raised eyebrows, one or more closed eyes, one or more fingers touching a face, an opened mouth, looking up, looking down, looking to the right, looking to the left, or being situated adjacent to, or in a field of view of, a predefined object.

15. The electronic device of claim 12, the at least one image comprising a first image and a second image, the one or more processors detecting movement of the person between the first image and the second image, wherein the authenticating occurs only where movement of the person is detected.

16. The electronic device of claim 12, the at least one image comprising a first image taken at a first field of view and a second image taken at a second field of view, wherein the first field of view is wider than the second field of view.

17. The electronic device of claim 12, the one or more processors further detecting one or more facial features from the at least one image, wherein the authenticating occurs only where the one or more facial features sufficiently match one or more predefined facial features stored within a memory of the electronic device.

18. A method, comprising:
storing, in a memory of an electronic device, predefined facial features of an authorized user of the electronic device;
capturing, with an imager, at least one image of a person within a vicinity of the electronic device;
scanning, with a depth imager, at least one facial depth scan of the person;
detecting, with a temperature sensor, a temperature of the person;
comparing the at least one image and the at least one facial depth scan with the predefined facial features;
determining whether the temperature is within a predefined temperature range; and
authenticating the person as the authorized user where the at least one image sufficiently matches some of the predefined facial features, the at least one facial depth scan sufficiently others of the predefined facial features, and the temperature is within the predefined temperature range.

19. The method of claim 18, further comprising determining, from one or more of the at least one image and the at least one facial depth scan, whether the person moves, wherein the authenticating occurs only where the person moves.

20. The method of claim 18, further comprising locking the electronic device upon failing to authenticate the person.

* * * * *